United States Patent [19]

Rickenbach et al.

[11] Patent Number: 5,633,963
[45] Date of Patent: May 27, 1997

[54] OPTICAL ROTARY JOINT FOR SINGLE AND MULTIMODE FIBERS

[75] Inventors: Robert Rickenbach, Thousand Oaks; Gilbert F. Perleberg, Goleta, both of Calif.

[73] Assignee: Raytheon Company, Lexington, Mass.

[21] Appl. No.: 571,143

[22] Filed: Dec. 12, 1995

[51] Int. Cl.$^6$ .................................................. G02B 6/26
[52] U.S. Cl. .................... 385/25; 385/15; 385/31; 385/60; 385/70; 385/139; 385/72
[58] Field of Search ...................... 385/15, 25, 26, 385/31, 33, 34, 52, 53, 54, 59, 60, 70, 71, 73, 72, 139

[56] References Cited

U.S. PATENT DOCUMENTS

| | | | |
|---|---|---|---|
| 3,904,269 | 9/1975 | Lebduska et al. | 385/60 X |
| 3,910,678 | 10/1975 | McCartney et al. | 385/54 X |
| 3,922,064 | 11/1975 | Clark et al. | 385/54 X |
| 3,963,323 | 6/1976 | Arnold | 385/54 X |
| 4,087,158 | 5/1978 | Lewis et al. | 385/25 X |
| 4,124,272 | 11/1978 | Henderson et al. | 385/25 X |
| 4,193,665 | 3/1980 | Arnold | 385/52 X |
| 4,361,380 | 11/1982 | Marazzi | 385/53 X |
| 4,373,779 | 2/1983 | Dorsey | 385/25 X |
| 4,390,237 | 6/1983 | Marazzi | 385/53 X |
| 4,406,515 | 9/1983 | Roberts | 385/54 X |
| 4,484,796 | 11/1984 | Sato et al. | 385/54 X |
| 4,526,438 | 7/1985 | Essert | 385/52 X |
| 4,763,980 | 8/1988 | Gerber et al. | 385/53 X |
| 4,815,812 | 3/1989 | Miller | 385/25 X |
| 4,848,867 | 7/1989 | Kajioka et al. | 385/25 X |
| 4,892,379 | 1/1990 | Takeda et al. | 385/52 X |
| 4,898,446 | 2/1990 | Hinckley | 385/53 X |
| 4,898,447 | 2/1990 | Kuhlmann | 385/25 X |
| 4,909,589 | 3/1990 | Morris | 385/25 X |
| 4,953,941 | 9/1990 | Takehashi | 385/52 X |
| 5,039,193 | 8/1991 | Snow et al. | 385/25 |
| 5,062,682 | 11/1991 | Marazzi | 385/53 X |
| 5,115,483 | 5/1992 | Morency et al. | 385/53 X |
| 5,129,023 | 7/1992 | Anderson et al. | 385/70 |
| 5,187,768 | 2/1993 | Ott et al. | 385/140 X |
| 5,239,603 | 8/1993 | Sonoda et al. | 385/52 X |

FOREIGN PATENT DOCUMENTS

| | | | |
|---|---|---|---|
| 1262210 | 10/1989 | Canada | 385/52 X |
| 0194325A1 | 9/1986 | European Pat. Off. | 385/53 X |
| 0362128A1 | 4/1990 | European Pat. Off. | 385/60 X |
| 0429398A2 | 5/1991 | European Pat. Off. | 385/53 X |
| 4203966A1 | 8/1992 | Germany | 385/53 X |

*Primary Examiner*—Brian Healy
*Attorney, Agent, or Firm*—Michaelson & Wallace

[57] ABSTRACT

The present invention provides a rotary joint for optical fibers comprising a plug assembly and a first ferrule having a fiber-entry end mounted coaxially therein, a receptacle assembly and a second ferrule having a fiber-entry end mounted coaxially therein, wherein at least one of the plug-mounted ferrule and the receptacle-mounted ferrule is biased outwardly from a fiber entry-end of the ferrule, and an alignment sleeve for optically connecting the first and second ferrules and maintaining the optical connection during rotation of one of the plug assembly and the receptacle assembly about an axis parallel to a longitudinal direction of the assembly relative to the other of the plug assembly and the receptacle assembly.

30 Claims, 3 Drawing Sheets

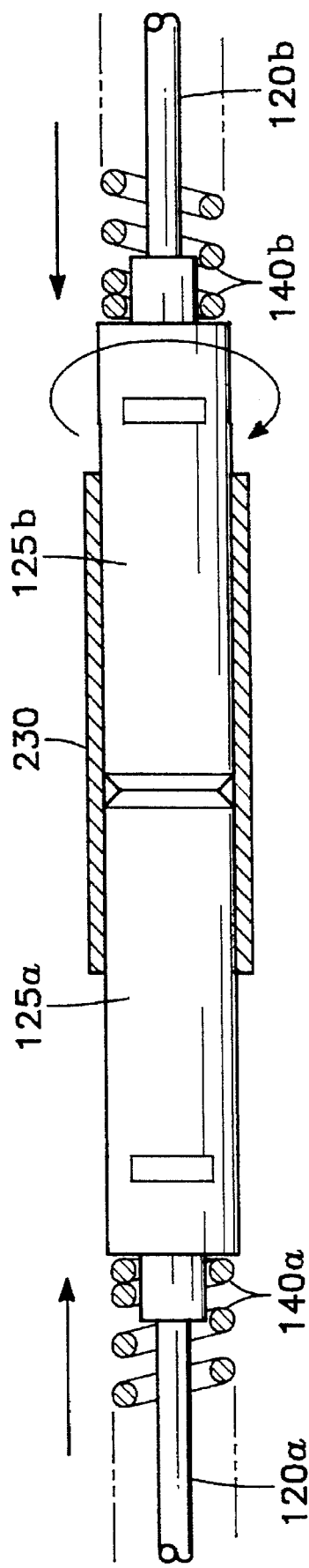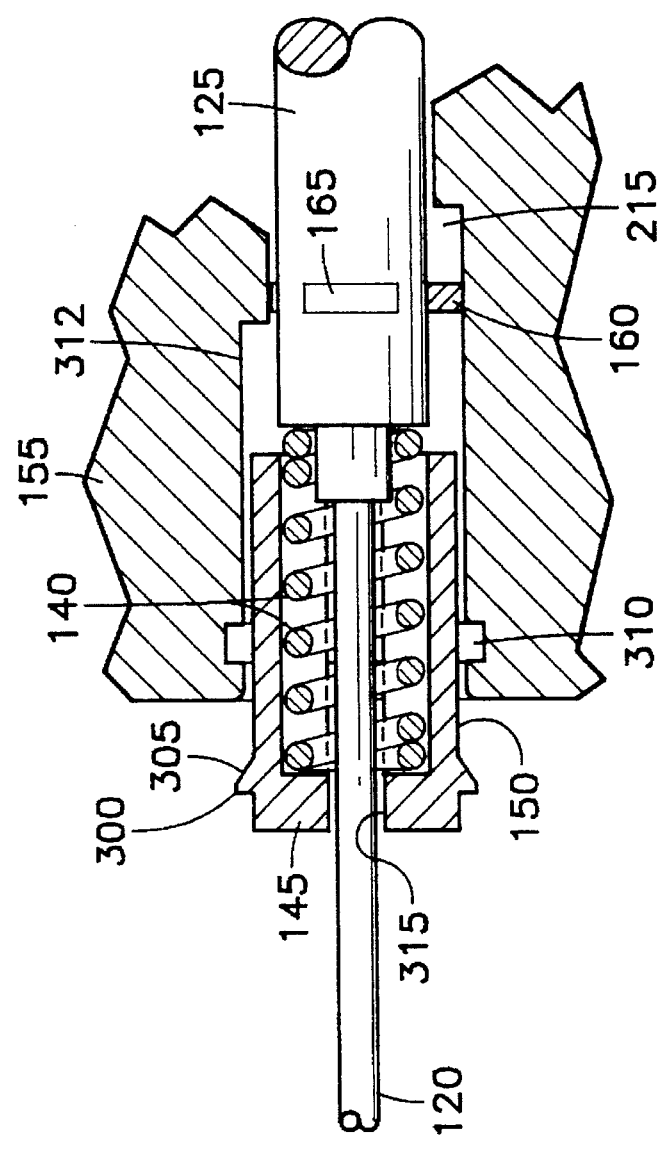

OPTICAL ROTARY JOINT FOR SINGLE AND MULTIMODE FIBERS

BACKGROUND OF THE INVENTION

1. Technical Field

The present invention relates to a compact rotary joint for the connection of single or multimode fibers that is capable of maintaining low connection losses when exposed to severe shock, vibration and temperature environments.

2. Background Art

In fiber optic waveguide transmission, rotary joints are required when there is a necessity to transmit optical signals between two turnable or rotatable members. Fiber optic rotary joints have been used infrequently, however, because of their high cost and design limitations.

For example, one approach to fiber optic rotary joint design has been to expand the beam and collimate it prior to passing through a rotary joint. The beam is then refocused and aligned with the receiving fiber optic. This method is used to reduce axial misalignment and to reduce sensitivity to contamination, but has several significant limitations.

This form of rotary joint is large and expensive due to the complexity required to maintain lens alignments with the fiber optics across the joint. Further, the axial alignment is critical to reduce insertion losses and is limited by bearing designs. This design feature restricts the use of such joints to benign environments, with limited operational ranges of temperature, vibration, shock and rates of angular rotation.

As a result of these factors, the performance of prior art rotary joints is marginal, with typical insertion losses for single mode fibers greater that 1 dB and return loss of 20 dB using high quality lenses.

SUMMARY OF THE INVENTION

The present invention provides a rotary joint for optical fibers comprising a plug assembly and a first ferrule having a fiber-entry end mounted coaxially therein, a receptacle assembly and a second ferrule having a fiber-entry end mounted coaxially therein, wherein at least one of the plug-mounted ferrule and the receptacle-mounted ferrule is biased outwardly from a fiber entry-end of the ferrule, and an alignment sleeve for optically connecting the first and second ferrules and maintaining the optical connection during rotation of one of the plug assembly and the receptacle assembly about an axis parallel to a longitudinal direction of the assembly relative to the other of the plug assembly and the receptacle assembly.

BRIEF DESCRIPTION OF THE DRAWINGS

FIG. 4 is a side view of a portion of the rotary joint of FIG. 1 showing the asymmetric assembly features.

FIG. 5 is a detailed cross sectional view of the rotary joint of FIG. 1 showing the threadless assembly features.

DETAILED DESCRIPTION OF THE PREFERRED EMBODIMENT

Figure 1:
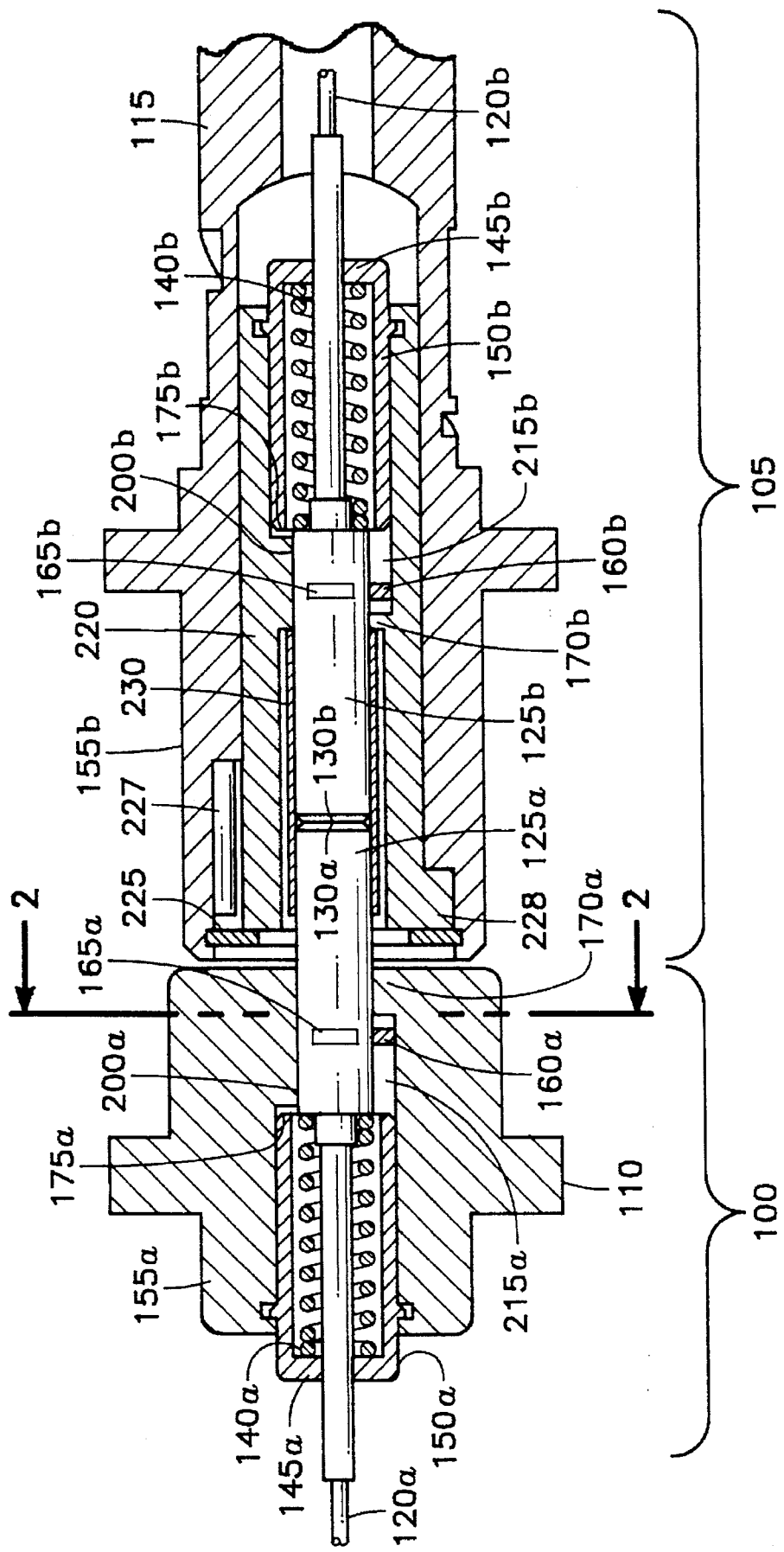
FIG. 1 is a cross section side view of a rotary joint according to the invention.

A rotary joint of the invention is shown in FIG. 1 and consists of a plug assembly 100 and a receptacle assembly 105. The rotary joint is not intended to be self-supporting or self-aligning and therefore requires an external structure for these purposes, and the invention can be used with a variety of such structures. For example, the plug assembly 100 is shown with a flange 110 for engagement using conventional means on a panel or chassis through which optical signals are typically transmitted. The receptacle assembly 105 is shown engaged with an axle 115 of an optical fiber reel, of a type known in the art.

In both the plug assembly 100 and the receptacle assembly 105, sleeved optical fibers 120a and 120b are terminated in precision ferrules 125a and 125b, having faces 130a and 130b, respectively. Fibers 120 are of a conventional design consisting of a glass core, glass cladding and plastic buffer coating, with a typical total diameter of 250 microns whether the fiber is single mode or multimode, which fibers are typically covered by a protective sleeve.

In both the plug assembly 100 and receptacle assembly 105, compression springs 140a and 140b are inserted over the fibers 120 and disposed against the ends of the ferrules 125 adjacent the fibers 120. The other ends of the springs 140 are disposed against flanges 145a and 145b of end caps 150a and 150b, respectively, by means of which the ferrules 125 are biased outwardly from the caps 150.

Materials selected for the plug assembly 100, receptacle assembly 105, end caps 150 and springs 140 should be stable, and resistant to corrosion, abrasion and friction in a dynamic environment. Preferred materials for these components are passivated stainless steel, anodized aluminum, beryllium copper, or ceramic.

Outward travel of the ferrule 125 from either the plug assembly 100 or the receptacle assembly 105 is limited by antirotation rings 160a and 160b that are engaged about flats 165a and 165b of the ferrule and disposed against retaining flanges 170a and 170b. This structure allows the ferrules 125 to translate in an axial direction as the springs 140 expand and compress. This translation is limited outwardly by engagement of the rings 160 with the flanges 170 and inwardly by engagement of the rings 160 with restraining lips 175a and 175b of the caps 150.

Figure 2:
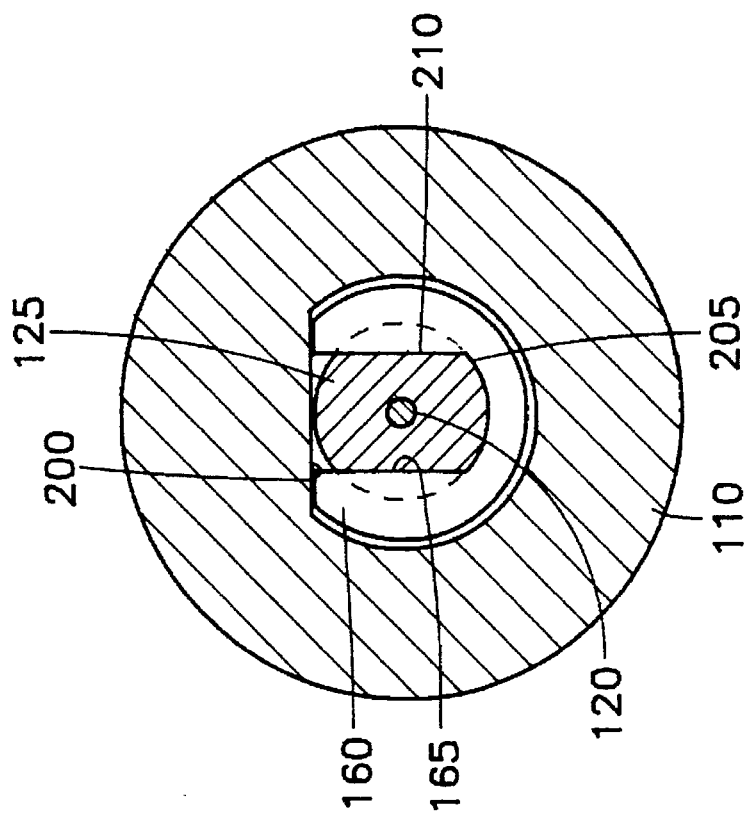
FIG. 2 is a cross section along section 2—2 of FIG. 1, showing the antirotation features of the invention.

As shown in FIG. 2, rotation of the ferrules 125 is prevented by the novel interaction of the antirotation ring 160 with a D-hole 200 provided inside the plug assembly 100 and receptacle assembly 105. The ring 160 is provided with a circular external shape with a cutout 205 having parallel sides 210 adapted to be received by flats 165 of the ferrules 125. The ring 160 is prevented from rotating more than a few degrees by the flat of D-hole 200, and the ferrules 125 are restrained in rotation by the secure fit of the ring 160 to the flats 165 of the ferrules.

This antirotation feature performs several significant functions. Initially, it prevents the ferrules 125 from rotating due to friction with a body 155 (shown in FIG. 1) during operation, while allowing longitudinal movement of the ferrule. This feature also prevents damage or breakage of the fibers 120 due to twisting during such operations as assembly of the ferrule 125 into the cap 150 (shown in FIG. 1).

Returning to FIG. 1, the designs of the plug assembly 100 and receptacle assembly 105 are similar, except that in the plug assembly the cap 150 is engaged with a body 155a. The receptacle assembly 105, however, is provided with a tubular insert 220 mounted coaxially within a body 155b in which the cap 150b is engaged. The insert 220 is secured in the body 155b by conventional means such as a snap type retaining ring 225 and contains means for optical connection of the ferrules during rotation, which means require precision machining. The insert 220 allows this machining to be performed more cost effectively on a small part independently of the body 155b. It also facilitates the assembly and disassembly of the receptacle assembly 105 by enabling removal of the retaining ring 225 and sliding the insert 220 out of the body 155b. The insert 220 is prevented from rotating in the body 155 by the use of a roll pin 227 inserted through an aperture in a flange 228 and into the body 155b.

One end of the insert 220 is provided with the D-hole 200b and a split sleeve 230 is disposed coaxially at the other end of the insert. The split sleeve 230 has an external diameter smaller than the internal diameter of insert 220. This clearance fit enables the ferrule and sleeve assembly to rotate and translate about transverse directions in order to absorb stresses during operation of the joint. The split sleeve 230 has an internal diameter smaller than the external diameters of the ferrules 125, and is provided with a slot 235 (shown in FIG. 3) that allows the sleeve to expand when ferrules 125 are inserted. The sleeve 230 thus provides a spring force against the ferrules 125 that ensures they are clamped in precise optical alignment of the fibers 120. As employed herein, "slot" means any opening having a narrow aspect ratio (i.e, in which length of the slot substantially exceeds its width) and extends along any path, including a straight line (as shown in FIG. 3), a spiral, a projection on any surface, or any other suitable path.

The material used for the sleeve 230 must not gall the spinning ferrules 125 and, consequently, a material dissimilar to that of the ferrule material is preferred. One preferred combination of materials is tungsten carbide for the ferrules 125 and a ceramic, such as zirconia, for the sleeve 230.

Figure 3:
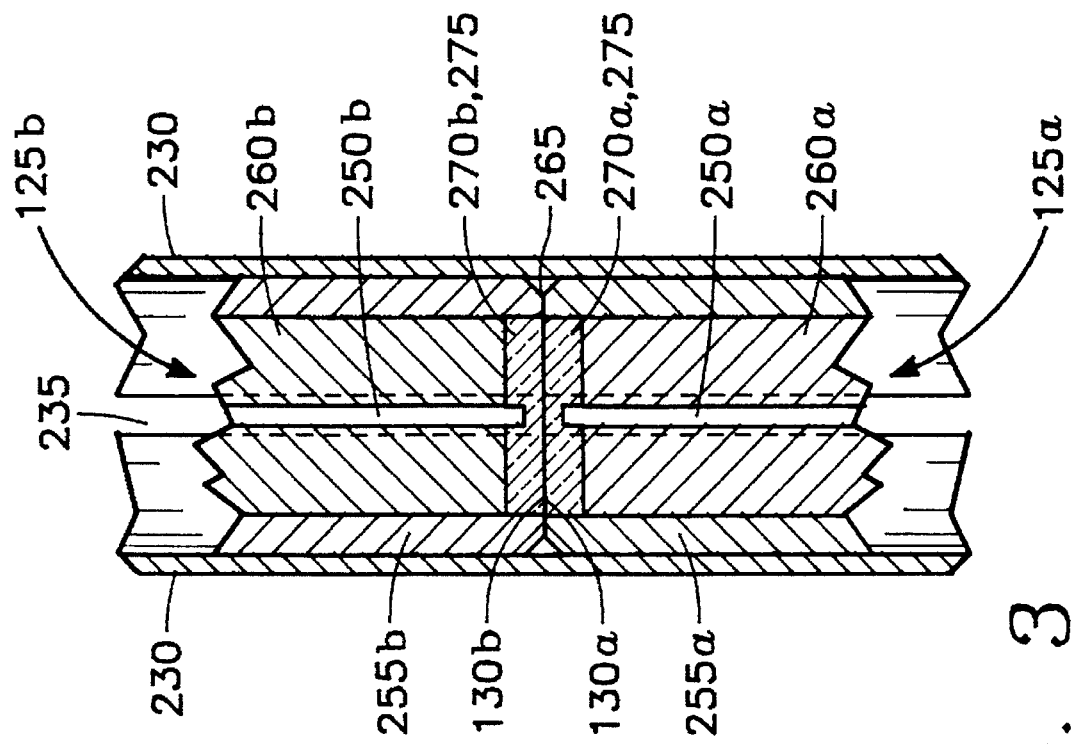
FIG. 3 is a detailed cross sectional view of a portion of the rotary joint of FIG. 1 showing a ferrule contacting surface.

When the plug assembly 100 is engaged with the receptacle assembly 105, the ferrules 125 slidably engage the sleeve 230 to a position in which the ferrules abut one another as shown is FIG. 3. The ferrules 125 of the invention, however, are different from prior art ferrules because the faces 130 have been modified as shown in FIG. 3.

In a ferrule 125 of the invention, optical cores 250a and 250b are mounted coaxially inside ferrule jackets 255a and 255b using ferrule inserts 260a and 260b. The cores 250 and inserts 260 are both recessed from a contact surface 265 to avoid fiber contact, forming pockets 270a and 270b. The gap between cores 250 prevents galling or other damage to the cores during rotation of the connector, which damage would result in increased transmission losses and reduced useful life of the joint. The pockets 270 provide spaces for trapping any contaminants produced during assembly or operation of the connector, which could interfere with the optical path between cores 250. In addition, the gap between cores 250 accommodates a tendency of the cores to translate axially, or "piston", during operation of the connector.

The cores 250 are preferably recessed to a depth of approximately 5 to 10 microns from the surface 265, and the inserts 260 are preferably recessed to a depth of approximately 0.005 inches. A preferred material for the inserts 260 is nickel silver and a preferred material for the jackets 255 is tungsten carbide. The recesses may be formed by conventional methods, such as wet etching to recess the inserts 260 and polishing after the etching to recess the cores 250.

The pockets 270 are filled with a suitable optical gel 275 that has a refractive index substantially the same as that of the cores 250 in order to reduce beam diffusion, insertion loss, and reflected power. The gel also lubricates the contact surface 265 between the jackets 255.

As shown in FIG. 4, the sleeve 230 is disposed asymmetrically over the ferrules 125a and 125b. This positioning produces an uneven distribution of friction between the ferrules 125 and the sleeve 230, and causes the sleeve to move in cooperation with the ferrule over which the larger portion of the sleeve is positioned (e.g. ferrule 125b in FIG. 4). This arrangement reduces total friction in the joint when compared to an arrangement in which the sleeve 230 is positioned symmetrically over the ferrules 125. This asymmetric positioning results in a joint with reduced energy consumption.

Referring to FIG. 1, components of the plug assembly 100 and receptacle assembly 105 are assembled using the novel threadless end cap 150, details of which are shown in FIG. 5. The cap 150 is provided with a radially extending flange 300 having a chamfer 305, at the end of the cap having the spring flange 145. A grove 310 is formed around an aperture 312 in the body 155 to receive the flange 300. A longitudinal slot 315 is also formed along the length of the cap 150.

The cap 150 is assembled in the body 155 by compressing the end of the cap having the flange 145, which compression is enabled by the longitudinal slot 315, by an amount to allow the flange 300 to be inserted into aperture 312 and be positioned adjacent the grove 310. This slidable engagement is facilitated by a chamfer 305. After the flange 300 is positioned adjacent the grove 310, the compression force is released and the flange 300 engages the grove 310. This engagement secures the cap 150 in the body 155. Further, an expansion of the cap 150 provides an outward spring force that provides additional securing means and prevents the cap 150 from becoming loose during vibration.

The cap 150 has additional novel features that reduce the cost and time to assemble the cap into the body 155. The longitudinal slot 315 has a width at least as large as the diameter of the fiber 120 and this allows the cap 150 to be attached after the ferrule 125 is attached to the fiber. This flexibility in assembly methods allows the joint to be assembled after the ferrules 125 are attached to the fibers 120.

A rotary joint of the invention is assembled by placing one of the caps 150 over each fiber 120 by inserting the fiber through the longitudinal slot 315, as shown in FIG. 5. The ferrule 125 may be attached to the fiber 120 either before or after the cap is placed over the fiber, but the spring 140 is preferably placed over the fiber 120 prior to the attachment of the ferrule 125 because the inner diameter of the spring is smaller than the diameter of the ferrule. Each cap 150 is then compressed and engaged with either the body 155A of the plug assembly 100 or the insert 220 in the receptacle assembly 105, as shown in FIG. 1. The ferrule 125b of the receptacle assembly 105 is inserted into the sleeve 230.

A small quantity of the selected optical gel is then placed on the face 130a and the ferrule 125a is inserted into the sleeve 230 to a position at which the faces 130a and 130b abut one another. As described previously, external structures such as the flange 110 and the axle 115 support and align the plug assembly 100 and receptacle assembly 105. The sleeve 230 clamps the ferrules 125 to attain precise alignment of the fibers 120 for transmission of an optical beam.

Once the ferrules 125 are inserted in the sleeve 230, a rigid assembly is formed (the "ferrule/sleeve assembly") that allows axial displacements to be absorbed by compression of the springs 140 and translation of the clamped ferrules 125 and sleeve 230 assembly along the longitudinal direction. The antirotation feature described previously facilitates this process because the ring 160 slides axially in cavities 215a and 215b (as shown in FIG. 1). Translations and rotations along transverse directions are also absorbed by the ferrule/sleeve assembly. Thus, the joint is able to accommodate these displacements during rotation while maintaining optical connection between the ferrules 125 and low transmission losses. A worst case transmission loss in a joint of the invention using 6 micron mode field diameter fiber spinning at 15,000 rpm was only 0.6 dB.

A rotary joint of the invention is able to maintain low transmission losses during rotation, and related shock, vibration, and thermal stresses because its many novel features absorb the stresses and strains of such an environment while isolating and protecting the precise alignment of the fibers at the ferrule faces from undergoing any displacement. Linear and angular displacements are accommodated by the ferrule/sleeve assembly that maintains precise alignment of the ferrules 125. During periods of larger longitudinal displacements, the ferrule/sleeve assembly acts as a fixed unit, "floating" between the springs 140. This design assures continuous optical connection and low transmission losses during rotation in severe shock, vibration and thermal environments.

In addition to its ability to maintain high optical connectivity during shock and vibration, a rotary joint of the invention has numerous other novel and advantageous features. The joint can achieve low transmission losses with fiber optic cables as small as 6 microns, and is also suitable for larger, multimode fibers.

The use of the novel insert 220 allows the ferrule 125 and fiber 120 to be assembled from either end of the body 155 of the receptacle assembly 105. This is a useful featrue because it allows the receptacle assembly 105 to be assembled even if access to either end of the assembly is limited or blocked. For example in FIG. 1, the ferrule 125 may be attached to the fiber 120 and inserted in the end of the body 155 facing the axle 115, and secured using cap 150. Alternately, the fiber 120, with ferrule 125 attached, could be inserted through the end of the body 155 opposite the axle 115.

The simple design of a joint of the invention results in low production costs. Only the following four components are specifically manufactured for the joint: the plug and receptacle bodies, the insert, and the cap. All other parts are standard production parts, except that the ferrules must be modified as described previously. In addition, assembly costs are reduced because parts are designed to snap in place, rather than having threaded joints that require threading and fastening.

Although the present invention has been described with reference to preferred embodiments, workers skilled in the art will recognize that changes may be made in form and detail without departing from the spirit and scope of the invention.

What is claimed:

1. A rotary joint for optical fibers comprising:

a plug assembly and a first ferrule having a fiber-entry end mounted coaxially therein;

a receptacle assembly and a second ferrule having a fiber-entry end mounted coaxially therein, wherein at least one of said plug-mounted ferrule and said receptacle-mounted ferrule is biased outwardly from a fiber entry-end of said ferrule; and an alignment sleeve disposed over facing portions of said ferrules for optically connecting said first and second ferrules and maintaining said optical connection during rotation of one of said plug assembly and said receptacle assembly about an axis parallel to a longitudinal direction of said assembly relative to the other of said plug assembly and said receptacle assembly.

2. The rotary joint of claim 1 further comprising:

a slot in said alignment sleeve for allowing resilient expansion and contraction of said alignment sleeve.

3. The rotary joint of claim 1 wherein said ferrules are positioned asymmetrically within said sleeve so that during rotation of one of said ferrules friction is reduced.

4. The rotary joint of claim 1 wherein each of said fibers has a coaxial glass core, said rotary joint further comprising:

a longitudinal gap between said glass cores of said optically connected ferrules to prevent damage to said cores during rotation of one of said plug assembly and said receptacle assembly.

5. The rotary joint of claim 4 wherein said gap is on the order of 10 to 20 microns.

6. The rotary joint of claim 1 wherein each of said fibers has a glass core and said optically connected ferrules form a contact surface, and wherein each of said ferrules further comprises:

a concentric jacket;

an insert mounted inside said jacket and recessed from said contact surface by approximately 0.005 inches; and a pocket formed between said insert and said contact surface.

7. The rotary joint of claim 6 further comprising:

an optical gel retained in said pocket, said gel having an index of refraction substantially matching that of said glass core.

8. The rotary joint of claim 1 further comprising:

a biasing assembly for constraining longitudinal motion of one of said plug assembly and said receptacle assembly with respect to the other of said plug assembly and said receptacle assembly and maintaining said optical connection.

9. The rotary joint of claim 8 wherein said biasing assembly comprises:

a restraining flange on said one of said plug assembly and said receptacle assembly; and a biasing spring disposed between said fiber-entry end of one of said ferrules and said restraining flange.

10. The rotary joint of claim 1 wherein said plug assembly has a fiber-entry end and said receptacle assembly has a fiber-entry end, said rotary joint further comprising an endcap assembly for securing at least one of said ferrules in one of said plug assembly and said receptacle assembly, said endcap assembly comprising:

an internal groove formed in one of said plug assembly and said receptacle assembly adjacent one of said fiber-entry end of said plug assembly and said fiber-entry end of said receptacle assembly; and an endcap including a restraining lip adapted to be received by said internal groove and a longitudinally extending slot for deforming said endcap to engage said lip in said groove, and an inwardly disposed restraining flange for limiting longitudinal travel of one of said ferrules.

11. The rotary joint of claim 10 wherein said slot has a width at least as large as a diameter of said fibers.

12. The rotary joint of claim 1 further comprising:

an insert for concentric mounting of said sleeve, wherein said insert is adapted to be removably mounted in said receptacle assembly.

13. The rotary joint of claim 12 wherein said plug assembly has a fiber-entry end and said insert has a fiber-entry end, said rotary joint further comprising an endcap assembly for securing at least one of said ferrules in at least one of said plug assembly and said insert, said endcap assembly comprising:

an internal groove formed in one of said plug assembly and said insert adjacent one of said fiber-entry end of said plug assembly and said fiber-entry end of said insert; and an endcap including a restraining lip adapted to be received by said internal groove and a longitudinally extending slot for deforming said endcap to engage said lip in said groove, and an inwardly disposed restraining flange for limiting longitudinal travel of one of said ferrules.

14. The rotary joint of claim 13 wherein said longitudinal slot has a width at least as large as a diameter of said fibers.

15. The rotary joint of claim 1 further comprising:

antirotation means for minimizing rotation of said ferrules in at least one of said plug assembly and said receptacle assembly.

16. The rotary joint of claim 15 wherein said antirotation means comprises:

a restraining aperture in said assembly concentric with a ferrule and having a flat on a portion of a circumference of said aperture; and an antirotation ring adapted to engage flats formed on said ferrule and engage said aperture flat so as to constrain rotation of said ring and said ferrule within said aperture.

17. A rotary joint for optical fibers, each terminating in a ferrule mounted coaxially in a relatively rotatable adapter, wherein said ferrules are clamped together in an optically transmitting position by an alignment sleeve, said rotary joint comprising:

a slot in said alignment sleeve for allowing resilient expansion and contraction of said alignment sleeve.

18. A rotary joint for optical fibers, each terminating in a ferrule mounted coaxially in a relatively rotatable adapter, wherein said ferrules are clamped together in an optically transmitting position by an alignment sleeve, wherein said ferrules are positioned asymmetrically within said sleeve so that during rotation of one of said ferrules friction is reduced.

19. A rotary joint for optical fibers, each terminating in a ferrule having a glass core and mounted coaxially in a relatively rotatable adapter, wherein said ferrules are clamped together in an optically transmitting position by an alignment sleeve, said rotary joint comprising:

a longitudinal gap, defined by at least one of said terminated fibers recessed within at least one of said ferrules, between said glass cores of said optically connected ferrules to prevent galling of said cores during rotation of one of said plug assembly and said receptacle assembly.

20. The rotary joint of claim 19 wherein said gap is on the order of 10 to 20 microns.

21. A rotary joint for optical fibers, each terminating in a ferrule having a glass core and mounted coaxially in a relatively rotatable adapter, wherein said ferrules are clamped together in an optically transmitting position by an alignment sleeve, said rotary joint comprising:

a concentric jacket;

an insert mounted inside said jacket and recessed from said contact surface by approximately 0.005 inches; and a pocket formed between said insert and said contact surface.

22. The rotary joint of claim 21 further comprising:

an optical gel retained in said pocket, said gel having an index of refraction substantially matching that of said glass core.

23. A rotary joint for optical fibers, each terminating in a ferrule mounted coaxially in a relatively rotatable adapter and having a fiber-entry end, said rotary joint comprising:

an alignment sleeve mounted in one of said relatively rotatable adapters and disposed over facing portions of said ferrules so as to clamp together said ferrules in an optically transmitting position during rotation of one of said adapters with respect to the other of said adapters.

24. The rotary joint of claim 23 further comprising:

a biasing assembly mounted in one of said relatively rotatable adapters for constraining longitudinal motion of said adapter with respect to the other of said adapters and maintaining said optically transmitting position.

25. The rotary joint of claim 24 wherein said biasing assembly comprises:

a restraining flange on said one of said relatively rotatable adapters; and a biasing spring disposed between said fiber-entry end of one of said ferrules and said restraining flange.

26. A rotary joint for optical fibers, each terminating in a ferrule mounted coaxially in a relatively rotatable adapter, wherein said ferrules are clamped together in an optically transmitting position by an alignment sleeve, said rotary joint comprising:

an insert for concentric mounting of said sleeve, wherein said insert is adapted to be removably mounted in one of said adapters.

27. The rotary joint of claim 26 wherein said adapter has a fiber-entry end and said insert has a fiber-entry end, said rotary joint further comprising an endcap assembly for securing at least one of said ferrules in one of said adapter and said insert, said endcap assembly comprising:

an internal groove formed in one of said adapter and said insert adjacent one of said fiber-entry end of said adapter and said fiber-entry end of said insert; and an endcap including a restraining lip adapted to be received by said internal groove and a longitudinally extending slot for deforming said endcap to engage said lip in said groove, and an inwardly disposed restraining flange for limiting longitudinal travel of one of said ferrules.

28. The rotary joint of claim 27 wherein said slot has a width at least as large as a diameter of said fibers.

29. A rotary joint for optical fibers, each terminating in a ferrule mounted coaxially in a relatively rotatable adapter, said rotary joint comprising:

an alignment sleeve for clamping together said ferrules in an optically transmitting position; and an antirotation assembly in at least one of said adapters for minimizing rotation of said ferrules in at least one of said adapters.

30. The rotary joint of claim 29 wherein said antirotation assembly comprises:

a restraining aperture in said one of said adapters concentric with one of said ferrules and having a flat on a portion of a circumference of said restraining aperture; and an antirotation ring adapted to engage flats formed on said one of said ferrules and to engage said aperture flat so as to constrain rotation of said antirotation ring and said one of said ferrules within said restraining aperture.

* * * * *